United States Patent
Li et al.

(10) Patent No.: US 9,158,965 B2
(45) Date of Patent: Oct. 13, 2015

(54) METHOD AND SYSTEM FOR OPTIMIZING ACCURACY-SPECIFICITY TRADE-OFFS IN LARGE SCALE VISUAL RECOGNITION

(71) Applicant: The Board of Trustees for the Leland Stanford Junior University, Stanford, CA (US)

(72) Inventors: Fei-Fei Li, Stanford, CA (US); Jia Deng, Ann Arbor, MI (US); Jonathan Krause, Stanford, CA (US); Alexander C. Berg, Carrboro, NC (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 7 days.

(21) Appl. No.: 13/831,833

(22) Filed: Mar. 15, 2013

(65) Prior Publication Data

US 2014/0086497 A1    Mar. 27, 2014

Related U.S. Application Data

(60) Provisional application No. 61/659,940, filed on Jun. 14, 2012.

(51) Int. Cl.
   *G06K 9/00* (2006.01)
   *G06K 9/62* (2006.01)
(52) U.S. Cl.
   CPC ........ *G06K 9/00369* (2013.01); *G06K 9/00664* (2013.01); *G06K 9/6282* (2013.01)
(58) Field of Classification Search
   None
   See application file for complete search history.

(56) References Cited

U.S. PATENT DOCUMENTS

2001/0037324 A1* 11/2001 Agrawal et al. .................... 707/1
2011/0320454 A1* 12/2011 Hill et al. ...................... 707/739

OTHER PUBLICATIONS

Deng et al, "What Does Classifying More Than 10,000 Image Categories Tell Us?" 2010, Computer Vision—ECCV 2010, Springer Berlin Heidelberg, pp. 71-84.*
Larson, "Calculus," 6th Edition, 1998, Houghton Mifflin, p. 902.*
Deng et al., "Hedging Your Bets: Optimizing Accuracy-Specifity Trade-offs in Large Scale Visual Recognition", Computer Vision and Pattern Recognition (CVPR), 2012 IEEE Conference on Jun. 16-21, 2012, pp. 3450-3457.
Grall-Maes et al., "Optimal decision rule with class-selective rejection and performance constraints", Pattern Analysis and Machine Intelligence, vol. 31, No. 11, Nov. 2009, pp. 2073-2082.
Ha, "The Optimum class-selective rejection rule", Pattern Analysis and Machine Intelligence, vol. 19, No. 6, Jun. 1997, pp. 608-615.
Stanford Vision Lab, "Large Scale Visual Recognition Challenge 2010 (ILSVRC 2010)", Retrieved from: http://image-net.org/challenges/LSCVR/2010/index, Printed May 8, 2015, 3 pgs.
Stanford Vision Lab, "Large Scale Recognition Challenge 2010 (ILSVRC2010)", Original URL: http://www.image-net.org/challenges/LSVRC/2010/, printed May 8, 2015 from: http://web.archive.org/web/20120302202228/http://www.image-net.org/challenges/LSVRC/2010, 2 pgs.

(Continued)

*Primary Examiner* — Bhavesh Mehta
*Assistant Examiner* — David F Dunphy
(74) *Attorney, Agent, or Firm* — KPPB LLP

(57) ABSTRACT

As visual recognition scales up to ever larger numbers of categories, maintaining high accuracy is increasingly difficult. Embodiment of the present invention include methods for optimizing accuracy-specificity trade-offs in large scale recognition where object categories form a semantic hierarchy consisting of many levels of abstraction.

4 Claims, 14 Drawing Sheets

(56) References Cited

OTHER PUBLICATIONS

Torralba et al., "80 million tiny images: a large dataset for non-parametric object and scene recognition", IEEE Transaction of Pattern Analysis and Machine Intelligence, 30(11):1958-1970, Nov. 2008.

Vailaya et al., "Content-based hierarchical classification of vacation images", IEEE Multimedia Computing and Systems, vol. 1, Jul. 1999, pp. 518-523.

* cited by examiner

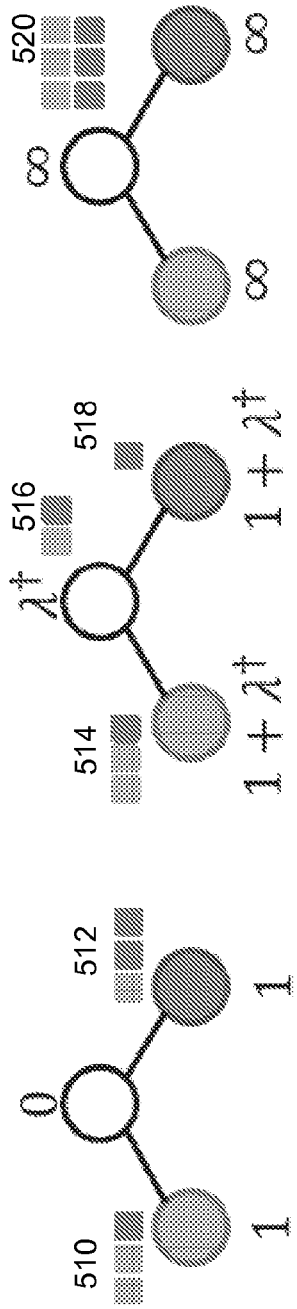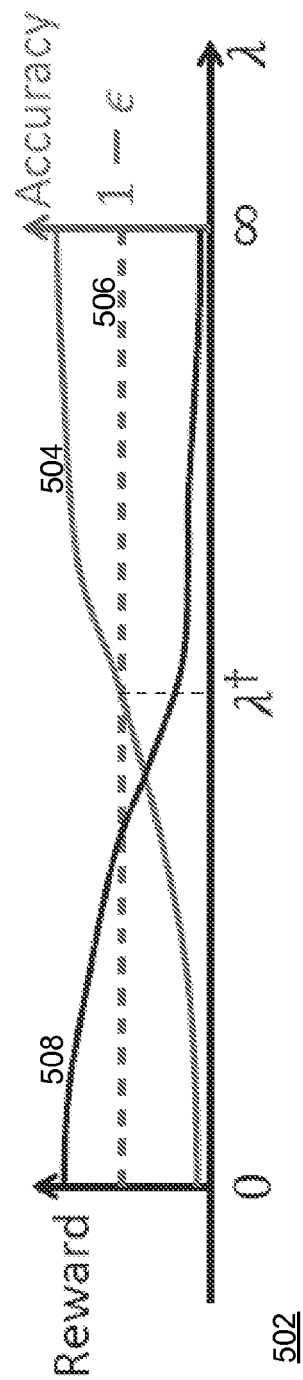
Fig. 5B
Fig. 5A

Algorithm 1 DARTS

1. Obtain $p_{Y|X}(y|x), y \in \mathcal{Y}$.
2. $p_{Y|X}(v|x) \leftarrow \sum_{y \in \mathcal{Y}} [v \in \pi(y)] p_{Y|X}(y|x), \forall v \in \mathcal{V}$.
3. $f_0 \leftarrow \arg\max_{v \in \mathcal{V}} r_v p_{V|X}(v|x)$.
4. If $\Phi(f_0) \geq 1 - \epsilon$, return $f_0$.
5. $\bar{\lambda} \leftarrow (r_{max}(1-\epsilon) - r_0)/\epsilon$, where $r_{max} = \max_{v \in \mathcal{V}} r_v$.
6. Do binary search for a $\lambda \in (0, \bar{\lambda}]$ until $0 \leq \Phi(f_\lambda) - 1 + \epsilon \leq \tilde{\epsilon}$ for a maximum of $\mathcal{T}$ iterations. Return $f_\lambda$.

Table 1

| Dataset | Tr | Val | Ts | # Leaf | # Int | H |
|---|---|---|---|---|---|---|
| ILSVRC65 | 100 | 50 | 150 | 57 | 8 | 3 |
| ILSVRC1K | 1261 | 50 | 150 | 1000 | 676 | 17 |
| ImageNet10K | 428 | 214 | 213 | 7404 | 3043 | 19 |

Fig. 7

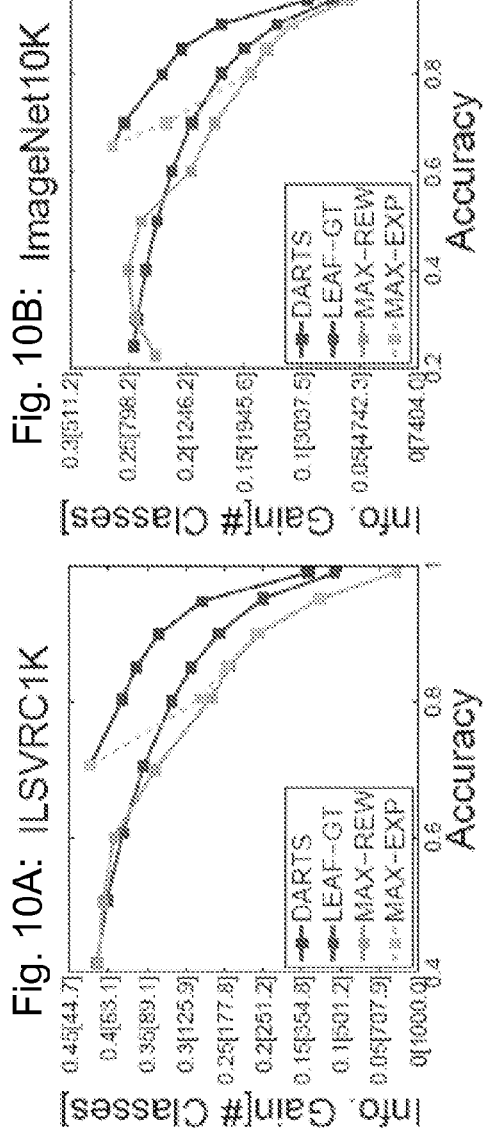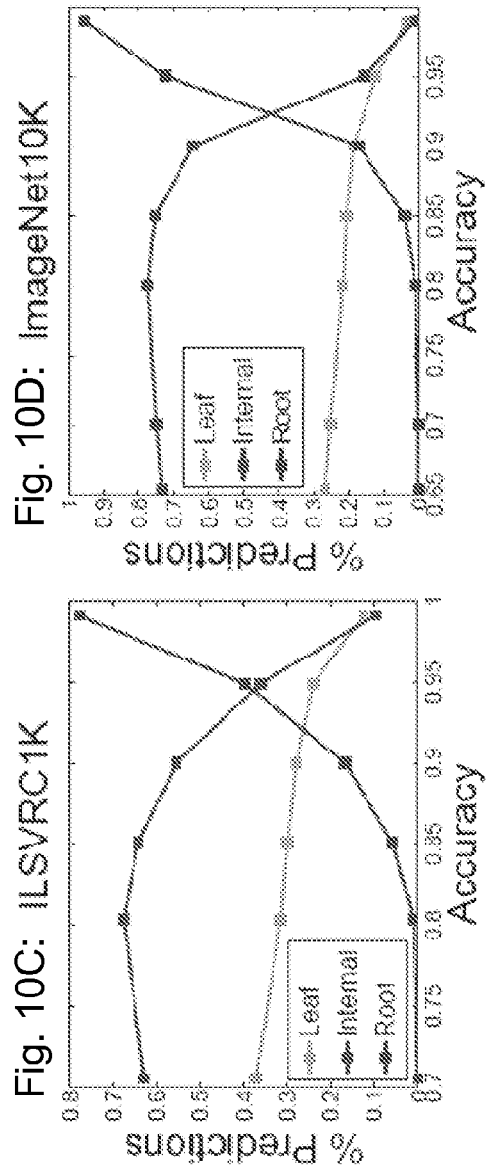
Fig. 10A: ILSVRC1K
Fig. 10B: ImageNet10K
Fig. 10C: ILSVRC1K
Fig. 10D: ImageNet10K 
METHOD AND SYSTEM FOR OPTIMIZING ACCURACY-SPECIFICITY TRADE-OFFS IN LARGE SCALE VISUAL RECOGNITION

CROSS-REFERENCE TO RELATED APPLICATIONS

This application claims priority to U.S. Provisional Application No. 61/659,940 filed Jun. 14, 2012, which is hereby incorporated by reference in its entirety for all purposes.

STATEMENT OF GOVERNMENT SPONSORED SUPPORT

This invention was made with Government support under contract 0845230 awarded by the National Science Foundation. The Government has certain rights in this invention.

FIELD OF THE INVENTION

The present invention generally relates to the field of computer visual recognition. More particularly, the present invention relates to methods for classifying images according to a hierarchy.

BACKGROUND OF THE INVENTION

Conservative estimates suggest that there are tens of thousands of object classes in the visual world. This number may scale up by orders of magnitude considering more fine-grained classes. An outstanding issue is whether computers can recognize object classes while minimizing mistakes, which is a challenging task even to a knowledgeable human.

This seems elusive given that the state of the art performance on 10 K-way classification is only 16.7%. There is, however, a way to always be right: just report everything as an "entity," which is not very informative.

In today's world, there are growing collections of images. With these collections of images, there is a further interest in classifying them so as to make them available for other purposes. For example, with properly classified images, searches could be performed on the content of the images rather than on text or other characteristics associated with them.

There is a need in the art for improved image classifiers. Moreover, there is a need for automatic image classification with reduced user input.

SUMMARY OF THE INVENTION

An embodiment of the present invention provides a cost-sensitive classification and hierarchical classification. Object recognition in images, such as labeling a human, chair, or dog in images is an important problem in computer vision and artificial intelligence.

As embodiments of the present invention, disclosed below are methods that provide a highly accurate classification of objects in images. As discussed below, an embodiment of the present invention is capable of associating multiple labels to an object, along with a concept taxonomy or hierarchy that allows users the option of choosing useful labels of the object according to their needs. In an embodiment of the invention, one label is associated with an image, but in other embodiments, various labels are associated with an image.

An embodiment of the present invention shows how to achieve a sensible result between two extremes of inaccurate choices forced among a large number of categories and the uninformative option of declaring that everything is an "entity."

These and other embodiments and advantages can be more fully appreciated upon an understanding of the detailed description of the invention as disclosed below in conjunction with the attached Figures.

BRIEF DESCRIPTION OF THE DRAWINGS

The following drawings will be used to more fully describe embodiments of the present invention.

FIG. 5A is a graph that depicts the general properties of the reward and accuracy of a classifier according to an embodiment of the present invention.

Shown in FIG. 5B is a representation of the accuracy of an embodiment of the present invention.

FIG. 6 is a summary of an algorithm according to an embodiment of the present invention.

FIG. 7 is a table that summarizes certain statistics associated with experiments performed on an embodiment of the present invention.

Figure 8:
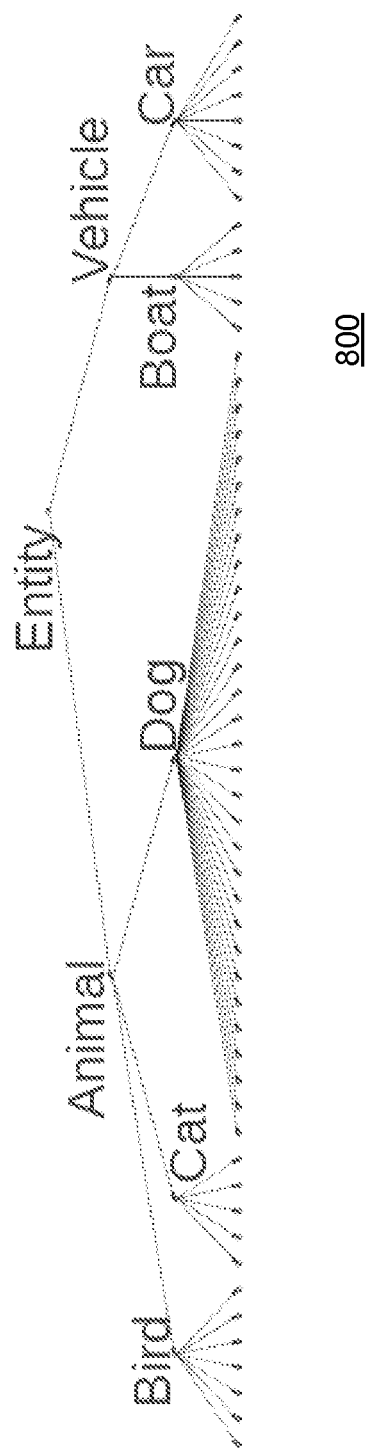

FIG. 8 is a representation of a tree structure according to an embodiment of the present invention.

Figures 9A, 9B:
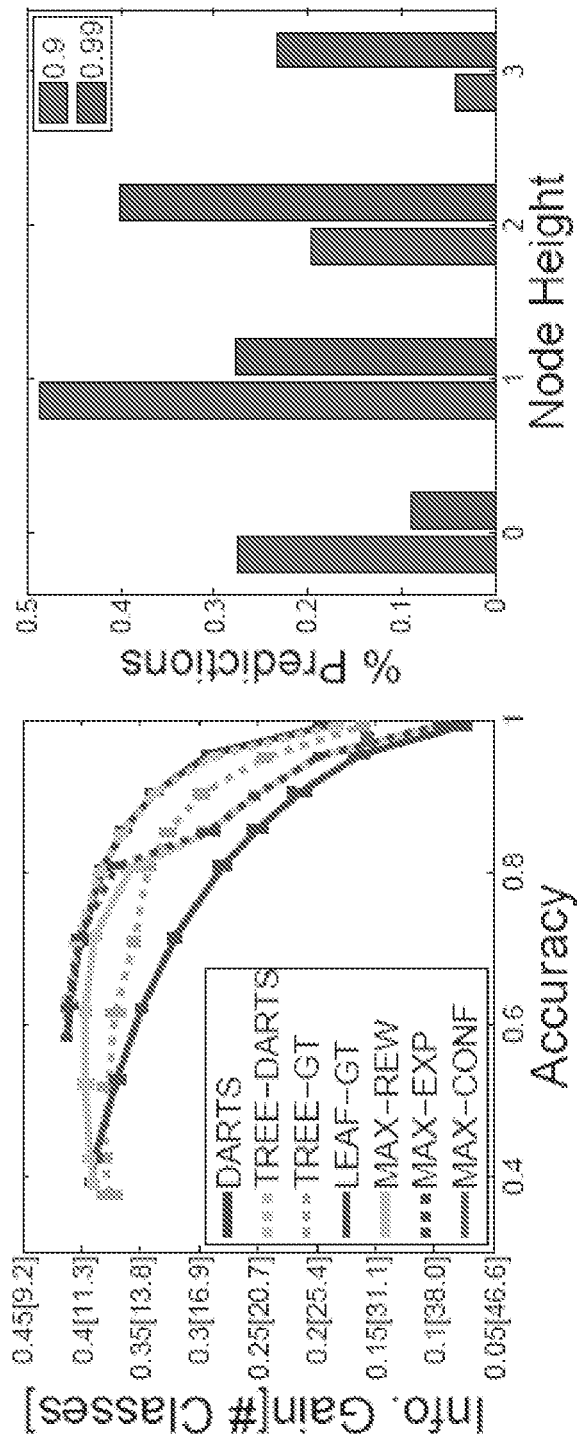

FIGS. 9A and 9B are graphs that characterize certain reward-vs-accuracy curves associated with an embodiment of the present invention.

FIGS. 10A-10D are graphs that characterize certain reward-vs-accuracy curves and distributions of predictions according to an embodiment of the present invention.

Figure 11:
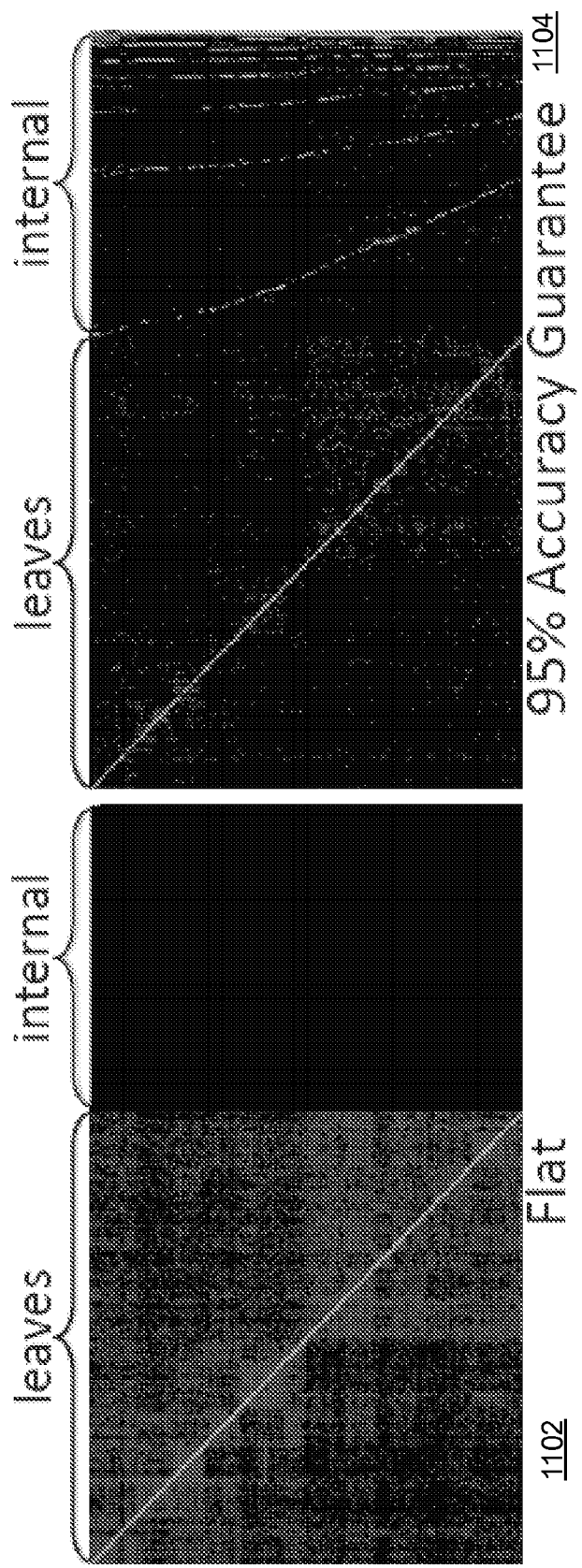

FIG. 11 depicts a comparison of confusion matrices on ILSVRC1K classes between a conventional classifier and a classifier according to an embodiment of the present invention.

Figure 12:

FIG. 12 is a collection of difficult test images in ILSVRC1K and the predictions made by a conventional classifier and a classifier according to an embodiment of the present invention.

Figure 13:
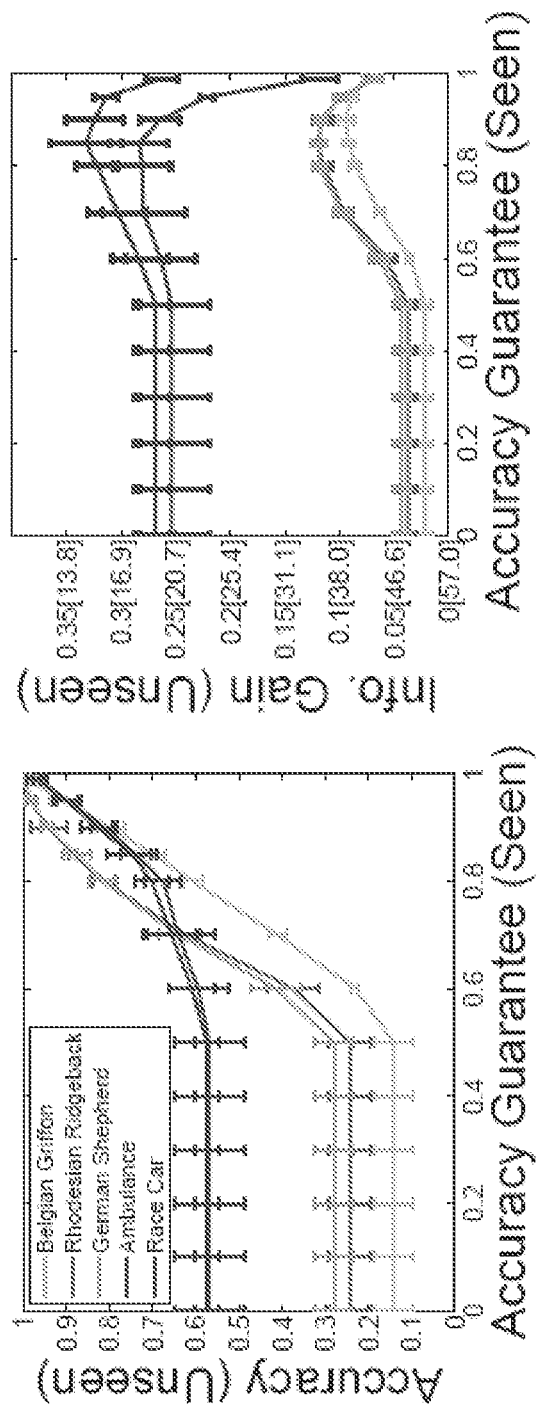

FIGS. 13A and 13B are graphs that represent accuracy and information gain of 5 randomly chosen unseen classes versus accuracy guarantees on seen classes on ILSVRC65.

Figure 14:

FIG. 14 depicts a comparison of the predictions of a conventional classifier versus a classifier according to an embodiment of the present invention.

DETAILED DESCRIPTION OF THE INVENTION

Figure 1:
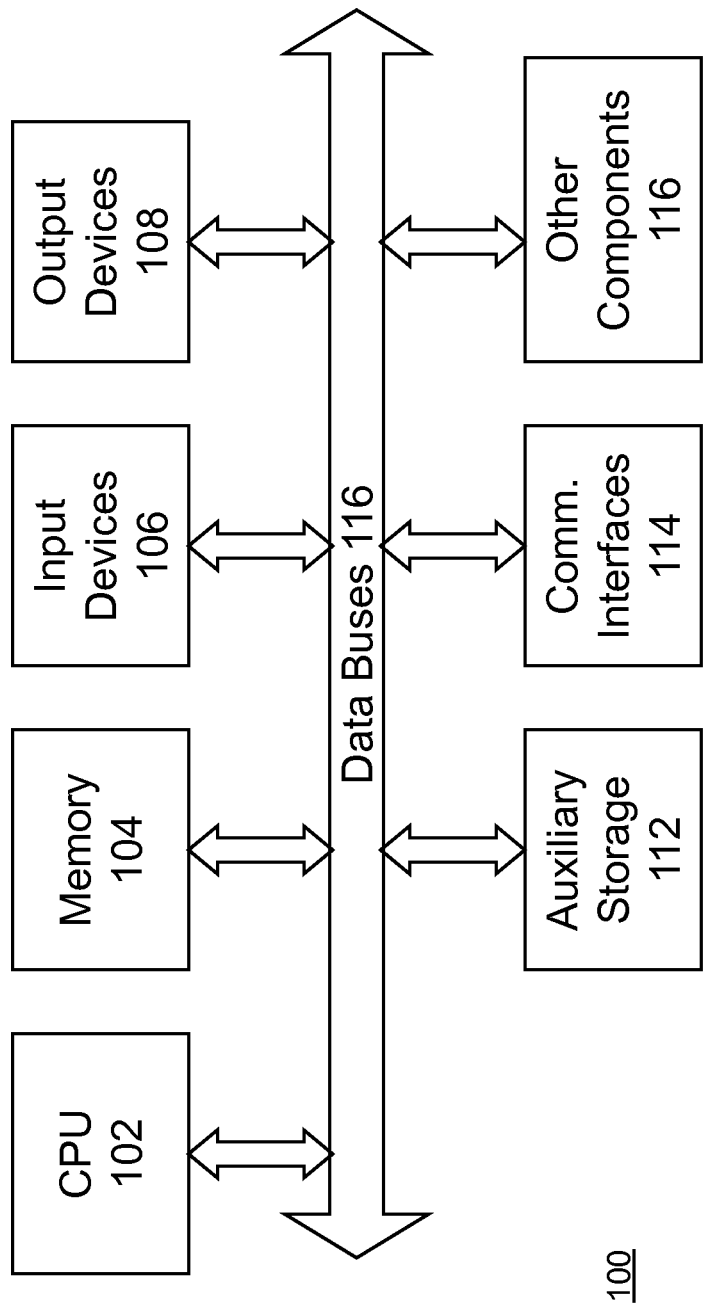
FIG. 1 is a block diagram of a computer system on which the present invention can be implemented.

Among other things, the present invention relates to methods, techniques, and algorithms that are intended to be implemented in a digital computer system 100 such as generally shown in FIG. 1. Such a digital computer is well-known in the art and may include the following.

Computer system 100 may include at least one central processing unit 102 but may include many processors or processing cores. Computer system 100 may further include memory 104 in different forms such as RAM, ROM, hard disk, optical drives, and removable drives that may further include drive controllers and other hardware. Auxiliary storage 112 may also be include that can be similar to memory 104 but may be more remotely incorporated such as in a distributed computer system with distributed memory capabilities.

Computer system 100 may further include at least one output device 108 such as a display unit, video hardware, or other peripherals (e.g., printer). At least one input device 106 may also be included in computer system 100 that may include a pointing device (e.g., mouse), a text input device (e.g., keyboard), or touch screen.

Communications interfaces 114 also form an important aspect of computer system 100 especially where computer system 100 is deployed as a distributed computer system. Computer interfaces 114 may include LAN network adapters, WAN network adapters, wireless interfaces, Bluetooth interfaces, modems and other networking interfaces as currently available and as may be developed in the future.

Computer system 100 may further include other components 116 that may be generally available components as well as specially developed components for implementation of the present invention. Importantly, computer system 100 incorporates various data buses 116 that are intended to allow for communication of the various components of computer system 100. Data buses 116 include, for example, input/output buses and bus controllers.

Indeed, the present invention is not limited to computer system 100 as known at the time of the invention. Instead, the present invention is intended to be deployed in future computer systems with more advanced technology that can make use of all aspects of the present invention. It is expected that computer technology will continue to advance but one of ordinary skill in the art will be able to take the present disclosure and implement the described teachings on the more advanced computers or other digital devices such as mobile telephones or "smart" televisions as they become available. Moreover, the present invention may be implemented on one or more distributed computers. Still further, the present invention may be implemented in various types of software languages including C, C++, and others. Also, one of ordinary skill in the art is familiar with compiling software source code into executable software that may be stored in various forms and in various media (e.g., magnetic, optical, solid state, etc.). One of ordinary skill in the art is familiar with the use of computers and software languages and, with an understanding of the present disclosure, will be able to implement the present teachings for use on a wide variety of computers.

The present disclosure provides a detailed explanation of the present invention with detailed explanations that allow one of ordinary skill in the art to implement the present invention into a computerized method. Certain of these and other details are not included in the present disclosure so as not to detract from the teachings presented herein but it is understood that one of ordinary skill in the art would be familiar with such details.

Image Classification

In an embodiment of the present invention, a key is to observe that object categories form a semantic hierarchy, consisting of many levels of abstraction. For example, a kangaroo is also a mammal, an animal, and a living thing. A preferred classifier should predict "mammal" instead if it is uncertain of the specific species. Meanwhile, the classifier should try to be as specific as possible.

Figure 2:
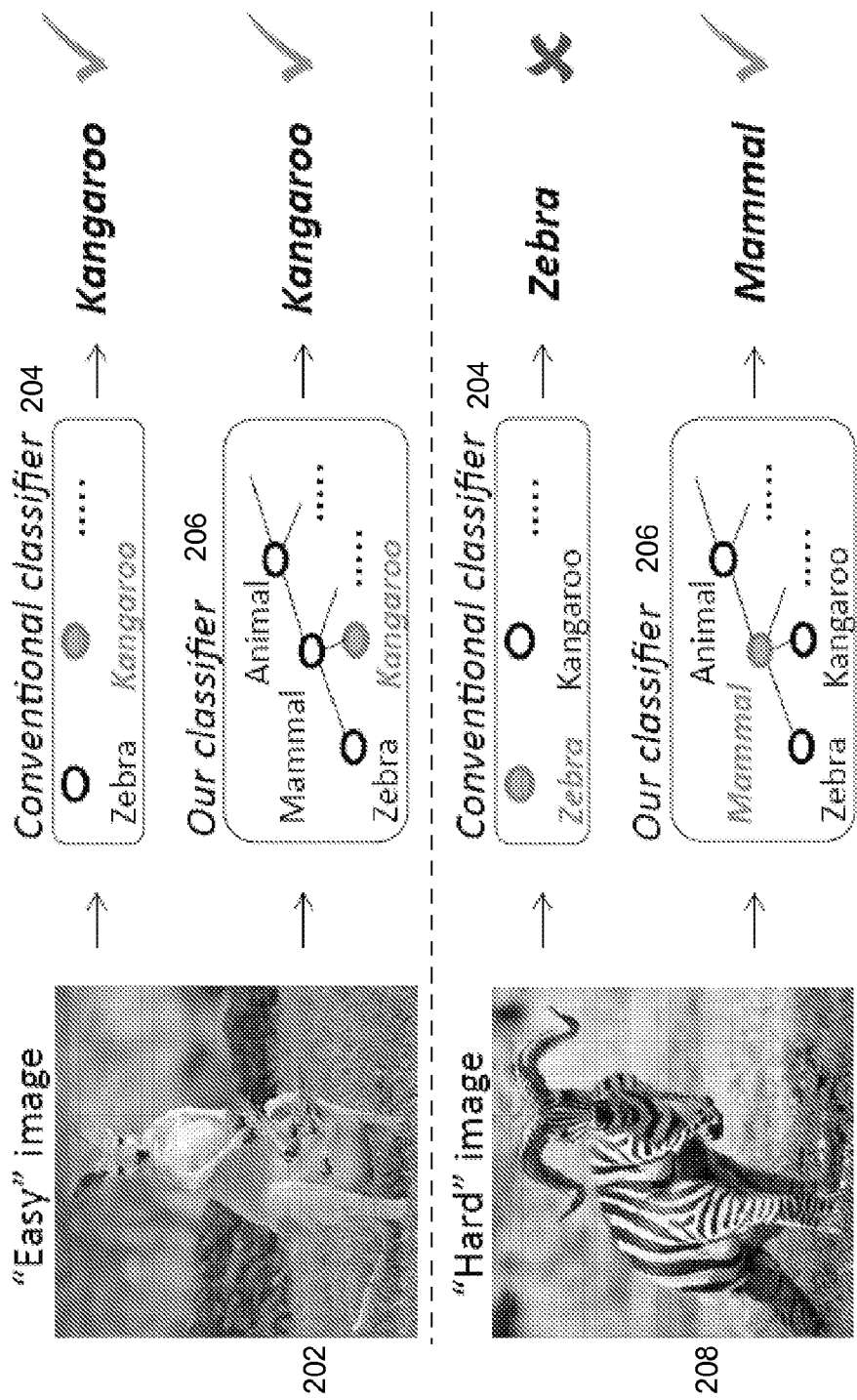
FIG. 2 is a representation of the operation of a conventional classifier versus a classifier according to an embodiment of the present invention.

Shown in FIG. 2 is a block diagram of the operation of a conventional classifier 204 and classifier 206 according to an embodiment of the present invention. It is contemplated that for image 202 which is generally an easy image to classify (a kangaroo), both classifier 204 and classifier 206 would generate a correct response. A more difficult situation arises with image 208 that is a difficult image to classify. As shown image 208 has characteristics of a kangaroo, zebra, and horned animal. Consider the image 208 in FIG. 2 where it would have been correct to report "animal," but choosing "mammal" using classifier 206 according to an embodiment provides more information without being wrong. A sensible classifier thus "hedges its bets" as necessary, maintaining high accuracy while making its best effort for specificity. Because, conventional classifier 204 does not have the ability to "hedge its bets" in this way, any one choice of zebra, kangaroo, or horned animal is incorrect.

In other embodiments of the present invention, many other hierarchies can be applied. For example, in an embodiment, a hierarchy can be implemented by a company offering a selection of products, wherein the hierarchy can be associated with a catalogue structure. In another embodiment, customized hierarchies can be implemented according to, for example, preferences associated with contemplated users. These and many other hierarchical applications can be implemented consistently with the teachings of the present invention.

A goal is to create a classification system that maximizes information gain while maintaining a fixed, arbitrarily small error rate. Information gain is measured in the standard information theoretical sense, e.g., the decrease in uncertainty from the prior distribution to the posterior over the classes. For example, the prior can be uniform among the tens of thousands of leaf nodes in a hierarchy. A classification output of "mammal," though maintaining uncertainty about the specific species, provides information by ruling out many other possibilities. Note that the algorithmic approach according to an embodiment of the present invention can also handle alternate, application-specific measures instead of information gain.

Results on datasets ranging from 65 to over 10,000 classes show that not only is an embodiment of the present invention effective at training classifiers that optimize information gain while maintaining high accuracy, but that the resulting classifications are informative. This is a step toward more widely useful classification by making explicit the trade-off between accuracy and specificity. This trade-off can be relevant in many visual tasks with high level semantic labels, e.g., detection, scene understanding, describing images with sentences, etc.

It should, however, be noted that in other embodiments of the present invention, many other hierarchies can be applied. For example, in an embodiment, a hierarchy can be implemented by a company offering a selection of products, wherein the hierarchy can be associated with a catalogue structure. In another embodiment, customized hierarchies can be implemented according to, for example, preferences associated with contemplated users. These and many other hierarchical applications can be implemented consistently with the teachings of the present invention.

In an embodiment of the present invention discussed below, multiclass image classification that serves as a building block is addressed. Embodiments of the present invention address optimizing the accuracy-specificity trade-off in large scale visual recognition.

Discussed below include: (1) an introduction to the problem of classification in a hierarchy subject to an accuracy bound while maximizing information gain (or other measures), (2) a description of the Dual Accuracy Reward Trade-off Search (DARTS) algorithm (an embodiment of the present invention), and (3) a discussion of a validation of the algorithm of the present invention with experiments on 65 to more than 10,000 classes showing large improvements over baseline approaches.

The teachings of the present invention can be implemented in many image recognition scenarios including within image search engines, image analyzers, mobile applications, digital library organizations, personal photo managements, among other things as would be known to those of ordinary skill in the art.

Advantages of the present invention include being able to provide a high accuracy in annotation and producing labels for a preferred or optimal quality under a predetermined accuracy setting. Embodiments of the present invention can use information gain defined on the semantic hierarchy as a reward to measure the predetermined desired quality of the labels. Embodiments of the present invention can deal with novel categories, which may not exist in the predetermined hierarchy, and its examples have not been previously observed. Embodiments of the present invention can predict or estimate a category in the hierarchy such that the novel category can be properly placed within the hierarchy.

Methods

As visual recognition scales up to ever larger numbers of categories, maintaining high accuracy is increasingly difficult. Embodiment of the present invention include methods for optimizing accuracy-specificity trade-offs in large scale recognition where object categories form a semantic hierarchy consisting of many levels of abstraction.

Figure 3:
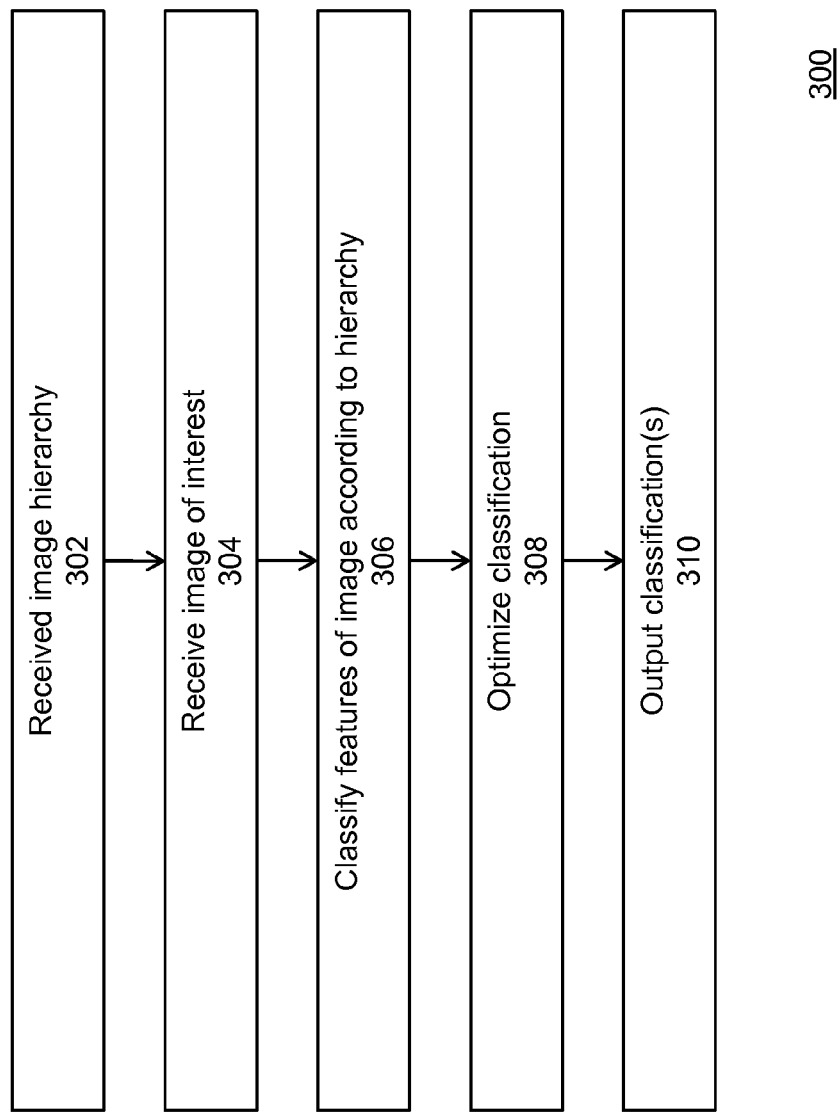
FIG. 3 is a flowchart of a method according to an embodiment of the present invention.

Shown in FIG. 3, is method 300 according to an embodiment of the present invention. At step 302, a method of the present invention receives a hierarchy consisting of various levels of abstraction for an image classification task. In an embodiment of the present invention, the hierarchy is a semantic hierarchy. In yet another embodiment, the hierarchy corresponds to product offerings for a company such as may be included in a product catalogue. In another embodiment of the present invention, the hierarchy is provided to be consistent with predetermined types of images. In another embodiment, however, the hierarchy is broadly based so as to be applicable to many types of images.

At step 304, an image of interest is received. Then at step 306, a classifier algorithm is applied to the image. In an embodiment, the features within the image are classified at step 306 using a classifier that is configured to, among other things, select an appropriate level within the hierarchy of step 302. In an embodiment, the classification is optimized at step 308. Among other things in an embodiment of the present invention, the optimization of step 308 is configured to trade off specificity for accuracy in a situation where uncertainty may exist. By optimizing this trade-off at step 308, the classification of the present invention can be as specific as possible while providing a predetermined level of accuracy, preferably a high level of accuracy. At step 310, the determined classification for features of the image according to the hierarchy is output.

In an embodiment of the present invention, the problem is formulated as maximizing information gain while ensuring a fixed, arbitrarily small error rate with a semantic hierarchy. An embodiment of the present invention is disclosed as the Dual Accuracy Reward Trade-off Search (DARTS) algorithm. With this embodiment, under practical conditions, an optimal or preferred solution can be obtained. Experiments demonstrate the effectiveness of the algorithm according to an embodiment on datasets ranging from 65 to over 10,000 categories.

Formulation

Figures 4A, 4B, 4C:
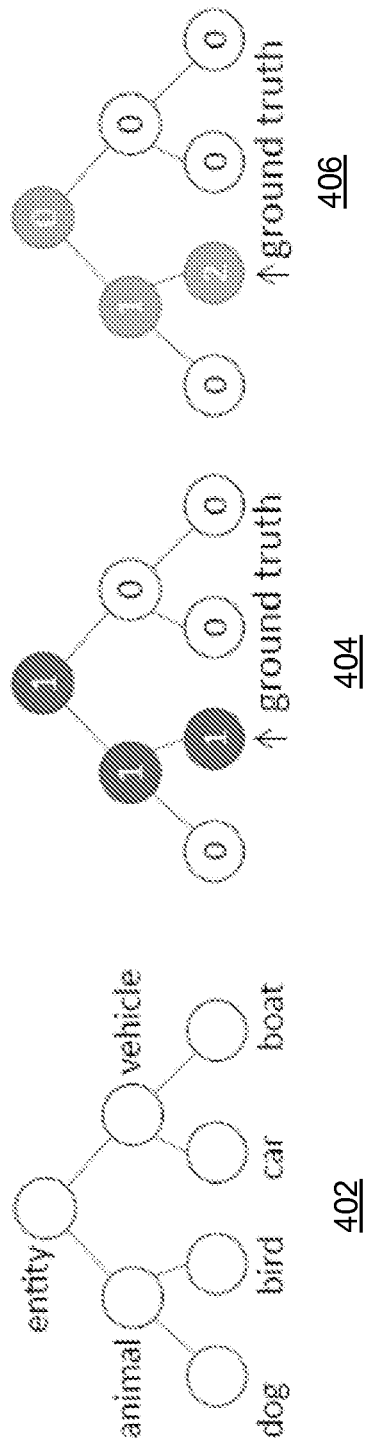
FIGS. 4A-4C are illustrations of the formulation with a semantic hierarchy according to an embodiment of the present invention.

The visual world is described with a semantic hierarchy $H=(V, E)$, a directed acyclic graph (DAG) with a unique root $\hat{v} \in V$, each node $v \in V$ representing a semantic class (see semantic hierarchy 402 in FIG. 4A). The leaf nodes $y \subset V$ are mutually exclusive classes. The internal nodes are unions of leaf nodes determined by the hierarchy, e.g., in semantic hierarchy 402 of FIG. 4A, "animal" is a combination of "dog" and "bird," while "entity" is a combination of everything under "animal" and "vehicle."

Given the hierarchy, it is then correct to label an image at either its ground truth leaf node or any of its ancestors (see hierarchy 404 that includes nodes indicated as "1" in FIG. 4B). For example, as shown in hierarchy 404, a "bird" correctly an "animal" and also an "entity." Let X be an image represented in some feature space and Y its ground truth leaf label, X and Y drawn from a joint distribution on X×Y. A classifier f: X→V an image x∈X as a node $v \in V$, either a leaf node or an internal node. The accuracy $\Phi(f)$ of the classifier f is then $$\Phi(f)=E[(f(X) \in \pi(Y)]^1, \qquad (1)$$

where $\pi(Y)$ is the set of all possible correct predictions, i.e., the ground truth leaf node and its ancestors. Note that "[P]" is the Iverson bracket, i.e., 1 if P is true and 0 otherwise. Further note that without the internal nodes, $\Phi(f)$ reduces to the conventional flat multiclass accuracy. In the present disclosure, "accuracy" is used in the hierarchical sense unless stated otherwise.

The conventional goal of classification is maximizing accuracy. In the present case, however, always predicting the root node ensures 100% accuracy, yielding an uninformative solution. An answer of "dog" is preferred over "entity" whenever they are both correct. This preference is encoded as a reward $r_v \geq 0$ for each node $v \in V$. One natural reward is information gain, the decrease in uncertainty (entropy) from the prior distribution to the posterior over the leaf classes. Assuming a uniform prior, it is verified that a prediction at node v decreases the entropy by $$r_v = \log_2 |Y| - \log_2 \sum_{y \in Y} [v \in \pi(y)]. \qquad (2)$$

The information gain is zero at the root node and maximized at a leaf node. Note that information gain in experiments is used but the algorithm and analysis according to an embodiment can accommodate an arbitrary non-negative reward. Given the reward of each node, the reward $R(f)$ for a classifier f is $$R(f) = \mathbb{E} \ (r_{f(X)}[f(X) \in \pi(Y)]), \qquad (3)$$

i.e., $r_v$ for a correct prediction at node v, and 0 for a wrong one. See hierarchy 406 in FIG. 4C that provides a reward of "2" at a leaf node of hierarchy 406 but no reward that the highest level (e.g., "entity") of the hierarchy. In the case of information gain, the reward of a classifier is the average amount of correct information it provides. A goal in an embodiment of the present invention is to maximize the reward given an arbitrary accuracy guarantee $0<0<1-\epsilon \leq 1$, e.g., $$\underset{f}{\text{maximize}} \quad R(f) \qquad \text{(OP1)}$$
$$\text{subject to} \quad \Phi(f) \geq 1 - \epsilon.$$

Note that OP1 is always feasible because there exists a trivial solution that only predicts the root node.

The DARTS Algorithm as an Embodiment of the Present Invention

An embodiment of the present invention implements the Dual Accuracy Reward Trade-off Search (DARTS) algorithm to solve OP1 and prove its optimality under practical conditions.

Shown in FIG. 5A is a graph that depicts the general properties of the reward and accuracy of $f_\lambda$, a classifier that maximizes the Lagrange function, with respect to the dual variable $\lambda$. For example, an optimal solution to OP1 is $f_{\lambda\dagger}$, where the accuracy is the minimum, provided $\lambda^\dagger$ exists. Shown in FIG. 5B is a representation of the accuracy of an embodiment of the present invention. For example, squares 510-520 represent image examples and their shading indicates the ground truth. The numbers next to the nodes are the transformed rewards $r_v+\lambda$ in the Lagrange function. As $\lambda$ increases, the classifier $f_\lambda$ predicts more examples to the root node. Eventually every example goes to the root node unless some other node already has posterior probability 1.

DARTS is a primal dual algorithm based on "the generalized Lagrange multiplier method." In an embodiment of the present invention, the dual variable controls the trade-off between reward and accuracy. The Lagrange function is written as $$L(f,\lambda)=R(f)+\lambda(\Phi(f)-1+\in), \quad (4)$$

with the dual variable $\lambda \geq 0$. Given a $\lambda$, a classifier $f_\lambda$ is obtained that maximizes the Lagrange function, a weighted sum of reward and accuracy controlled by $\lambda$. It can be shown that the accuracy of the classifier $\Phi(f_\lambda)$ is non-decreasing and the reward $R(f_\lambda)$ non-increasing with respect to $\lambda$. Moreover, if a $\lambda^\dagger \geq 0$ exists such that $\Phi(f_{\lambda\dagger})=1-\in$, i.e., the classifier $f_{\lambda\dagger}$ has an accuracy of exactly $1-\in$, then $f_{\lambda\dagger}$ is optimal for OP1. These properties, illustrated in graph 502 of FIG. 5, lead to a binary search algorithm to find such a $\lambda^\dagger$ in an embodiment of the present invention. At each step, the algorithm of an embodiment of the present invention seeks a classifier that maximizes the Lagrange function. It converges to an optimal solution provided such a $\lambda^\dagger$ exists.

To apply this framework, however, two challenges are addressed in an embodiment of the present invention: (1) finding the classifier that maximizes the Lagrange function and (2) establishing conditions under which $\lambda^\dagger$ exists and thus the binary search converges to an optimal solution. The latter is particularly non-trivial as counterexamples exist, e.g., the curve 504 in FIG. 5 can be discontinuous and as a result the dashed line 506 can fail to meet it.

Maximizing the Lagrange Function

DARTS, as implemented in an embodiment of the present invention, maximizes the Lagrange function by using posterior probabilities. Using Eqn. 3, Eqn. 1, and Eqn. 4 yields $$L(f,\lambda)=\mathbb{E}\ (r_{f(X)}+\lambda)[f(X)\in\pi(Y)]+\lambda(\in-1), \quad (5)$$

e.g., maximizing the Lagrange function is simply maximizing a transformed reward $r_v+\lambda$, $\forall v \in V$. This can be achieved by estimating posterior probabilities and predicting the node with the maximum expected reward, breaking ties arbitrarily. Let $f_\lambda$ be such a classifier given a $\lambda$, then $$f_\lambda(x) = \operatorname*{argmax}_{v \in V}(r_v + \lambda) p_{Y|X}(v \mid x), \quad (6)$$

where $p_{Y|X}(v|x)=Pr(v \in \pi(Y)|X=x)$. This can be easily proven by rewriting Eqn. 5 using iterated expectations, conditioning on X first.

Let's examine $f_\lambda$. When $\lambda=0$, $f_0$ simply maximizes the original reward. As tends to infinity, the transformed reward $r_v+\infty$ becomes equal on all nodes. The root node has maximum probability and therefore the best expected reward. Every example is predicted to the root node, unless some other node already has probability 1. Either way, all predictions are accurate with $\lambda=\infty$.

To obtain the posterior probabilities in an embodiment of the present invention, conventional one-vs-all classifiers on the leaf nodes (e.g., SVMs) are learned, probability estimates (e.g., via Platt scaling) are obtained. These are then summed to get internal node probabilities.

DARTS, as an embodiment of the present invention, is summarized in Algorithm 600 of FIG. 6. It should be noted that the described embodiments are illustrative and do not limit the present invention. It should further be noted that the method steps need not be implemented in the order described. Indeed, certain of the described steps do not depend from each other and can be interchanged. For example, as persons skilled in the art will understand, any system configured to implement the method steps, in any order, falls within the scope of the present invention.

In an embodiment, method 600 first obtains posterior probabilities for all nodes and exits if f0, the classifier that maximizes the original reward only, is already at least $1-\in$ accurate (step 1-4). Otherwise, method 600 does a binary search (steps 5 and 6) to find a $\lambda^\dagger>0$ such that the classifier that maximizes the transformed ward $r_v+\lambda^\dagger$ is exactly $1-\in$ accurate. The upper bound of the binary search interval, $\lambda^-$, is set such that $\lambda^\dagger \leq \lambda^-$ is guaranteed (proof in the supplemental material). DARTS runs for no more than T iterations or until $\Phi(f\lambda)$ is within a small number $\in^-$ from $1-\in$.

To obtain the classifier $f_\lambda$ given a new $\lambda$ (step 6), it suffices to have the posterior probabilities on the leaf nodes. In an embodiment, it is only needed to learn 1-vs-all classifiers on the leaf nodes once, e.g., DARTS essentially converts a "base" flat classifier with probability estimates to a hierarchical one with the optimal accuracy-specificity trade-off.

DARTS, as an embodiment of the present invention, is not sensitive to non-exact maximization of the Lagrange function, e.g., inaccurate probability estimates, as the error will not be amplified: if a solution $f_\lambda$ is within $\delta>0$ from the maximizing the Lagrange function, then with the accuracy guarantee set to that of $f_\lambda$, $f_\lambda$ is within $\delta$ from maximizing the reward.

Optimization

Under practical conditions, roughly when the posterior probabilities are continuously distributed, DARTS, as an embodiment of the present invention, converges to an optimized, preferred, or improved solution.

The key is to investigate when the dual variable $\lambda^\dagger$ exists, e.g., when the monotonic curve 504 in FIG. 5A can meet the dashed line. This is only of concern when $\Phi(f0)<1-\in$, e.g., the start of the red curve is below the dashed line, because otherwise the accuracy guarantee is already satisfied. With $\Phi(f0)<1-\in$, $\lambda^\dagger$ may not exist in two cases: (1) when the end of the curve is below the dashed line, i.e., $\Phi(f\infty)<1-\in$, or (2) when the curve is discontinuous. Certain theoretical results according to an embodiment of the present invention include that under normal conditions, these two cases cannot happen and then $\lambda_\dagger$ must exist.

Case(1) cannot happen because it cannot be shown that $\lambda^->0$ and $\Phi(f_{\lambda^-}) \geq 1-\in$, where $\lambda^-$ is defined in line 5 of DARTS.

Case(2) is more difficult because the curve can be discontinuous. However, it can be shown that case(2) cannot occur if the posterior probabilities are continuously distributed except possibly at 0 or 1, a condition normally satisfied in practice. Consider, for example, a hierarchy of two leaf nodes a and b. The posterior probability $p_{Y|X}(a|X)$, as a function of X, is also a random variable. The condition implies that the distribution of $p_{Y|X}(a|X)$ does not concentrate on any single real number other than 0 and 1, e.g., practically, the posterior probability estimates are sufficiently diverse.

Formally, let $$\Delta = \{q \in \mathbb{R}^{|Y|-1} : q \succeq 0, \|q\|_1 \leq 1\}$$

be the set of possible posterior probabilities over the $|Y|-1$ leaf nodes. Note that for $|Y|$ leaf nodes there are only $|Y|-1$ degrees of freedom. Let $$\Delta^{\ddagger} = \{q \in \Delta : \|q\|_{\infty} = 1 \vee q = 0\}$$

be the set of posterior probabilities at the vertices of $\Delta$, where one of the leaf nodes takes probability 1. Let $$\vec{p}_{Y|X} : X \to \Delta$$

be a Borel measurable function that maps an example x to its posterior probabilities on leaf nodes. Let $$Q = \vec{p}_{Y|X}(X)$$

be the posterior probabilities on leaf nodes for the random variable X. As a function of X, Q is also a random variable. A result according to an embodiment of the present invention is the following theorem.

Theorem 4.1. If $Pr(Q \in \Delta^{\ddagger})=1$, or Q has a probability density function with respect to the Lebesgue measure on $\mathbb{R}^{|Y|-1}$ conditioned on $Q \notin \Delta^{\ddagger}$, then, for any $0 \leq \in \leq 1$, DARTS converges to an optimized or preferred solution of OP1.

Sketch of Proof. The key steps are outlined here. The goal is to show the continuity of $\Phi(f_\lambda)$ with respect to $\lambda$. It is shown that $$\Phi(f_\lambda) = p^{\ddagger} + (1-p^{\ddagger}) \sum_{v \in V} \int_{\Gamma_v(\lambda)} q_v p_Q(q) dq,$$

where $p^{\ddagger}=Pr(Q \in \Delta^{\ddagger})$, $p_Q(q)$ is the (conditional) density function when $$Q \notin \Delta^{\ddagger}, \text{and } \Gamma_v(\lambda) = \{q \in \Delta : (r_v + \lambda) q_v > (r_{v'} + \lambda) q_{v'}, \forall v' \neq v\}$$

is the polyhedron in $\Delta$ that leads to a prediction v. The continuity of $\int_{\Gamma_v(\lambda)} q_v p_Q(q) dq$ with respect to $\lambda$ is then shown using Lebesgue's dominated convergence theorem.

Note that this condition differs from the one given in other approaches for strong duality in a general class selective rejection framework, i.e., a continuous density function $p_{X|Y}(x|y)=Pr(X=x|Y=y)$ exists for each $y \in Y$. First, neither condition implies the other. Second, theirs guarantees strong duality but not the optimality of a dual algorithm using only posterior probabilities to maximize the Lagrange function, as the maximizer may not be unique.

In practice, one can estimate whether the condition holds by checking the classifier $f_\lambda$ DARTS returns. If $\lambda=0$ or the accuracy of $f_\lambda$ is close to $1-\in$, the solution is near optimal. Otherwise $\lambda>0$ and the accuracy of $f_\lambda$ is $1-\in'$ not equal to $1-\in$, in which case the classifier $f\lambda$ is sub-optimal for the $1-\in$ accuracy guarantee, but it is nonetheless optimal for a guarantee of $1-\in'$.

Experiments

In an embodiment of the present invention, three datasets ranging from 65 to over 10,000 classes are used: ILSVRC65, ILSVRC1K, and ImageNet10K. They are all subsets of ImageNet, a database of many classes organized by the WordNet hierarchy. Table 1 (see FIG. 7) lists the statistics including average number of images per class for training (Tr), validation (Val) and test (Ts), number of leaf and internal nodes, and height of the hierarchy (H). The train/I/al/test split is used for ILSRVC1K. For ImageNet10K, a 50-25-25 train/I/al/test split is used and images from the internal nodes are excluded, as it is required that all images have ground truth at leaf nodes.

ILSVRC65 is a subset of ILSVRC1K consisting of the leaf nodes of 5 "basic" categories (e.g., see "dog", "cat", etc. in hierarchy 800 of FIG. 8), with a simplified hierarchy and a down-sampled training set. The smaller scale allows comparison with more baselines and a thorough exploration of parameter space.

In an embodiment of the present invention, all images are represented using the LLC features from densely sampled SIFT over a 16K codebook (10K for ILSVRC65) and a 2 level spatial pyramid (1×1 and 3×3). In an embodiment of the present invention, one-vs-all linear SVMs is trained, the outputs of each SVM converted to probabilities via Platt scaling, and then they are L1 normalized to get multiclass posterior probability estimates.

In implementing DARTS as an embodiment of the present invention, $f_\lambda$ is obtained using the training set but estimate $\Phi(f_\lambda)$, the expected accuracy of $f_\lambda$, is obtained using the validation set (see step 6). This reduces overfitting. To ensure with high confidence that the true expected accuracy satisfies the guarantee, the 0.95 confidence interval of the estimated $\Phi(f_\lambda)$ and stop the binary search are calculated when the lower bound is close enough to $1-\in$.

TREE-DARTS is also implemented as an embodiment of the present invention, a variant of DARTS that obtains posterior probabilities differently. It learns one-vs-all classifiers for each internal node to estimate the conditional posterior probabilities of the child nodes. It obtains the posterior probability of a node by multiplying all conditional posterior probabilities on its path from the root.

DARTS is compared with five baselines: LEAF-GT, TREE-GT, MAX-REW, MAX-EXP, MAX-CONF.

LEAF-GT is a naive extension of binary classification with a reject option. It takes the posterior probabilities on leaf nodes and predicts the most likely leaf node, if the largest probability is not below a fixed global threshold. Otherwise, it predicts the root node. LEAF-GT becomes a flat classifier with threshold 0 and the trivial classifier that only predicts the root node with any threshold above 1.

TREE-GT takes the same conditional posterior probabilities in TREE-DARTS but moves an example from the root to a leaf, at each step following the branch with the highest conditional posterior probability. It stays at an internal node if the highest probability is below a fixed global threshold. This represents a decision tree model.

MAX-REW predicts the node with the best reward among those with probabilities greater than or equal to a threshold. Intuitively, it predicts the most specific node among the confident ones. MAX-EXP is similar to MAX-REW, except that it predicts the node with the best expected reward, i.e., its posterior probability times its reward.

MAX-CONF learns a binary, one-vs-all classifier for each node, including all internal nodes except the root node. Given a test image, it predicts the node with the most confident classifier. Despite being intuitive, this baseline is fundamentally flawed. First, assuming accurate confidences, the confidence of a node should never be more than that of its parent, e.g., there cannot be more confidence that something is a dog than that it is an animal. Thus, in theory only the immediate children of the root node get predicted. Second, it is unclear how to satisfy an arbitrary accuracy guarantee—given the classifiers, the accuracy is fixed.

For all threshold-based baselines, a higher threshold leads to higher accuracy and typically less reward in the presently described experiments. To satisfy a particular accuracy guarantee, the best threshold is found by binary search.

All approaches are tested on ILVRC65 but exclude TREE-DARTS, TREE-GT, MAX-CONF on ILSVRC1K and ImageNet10K, because both TREE-DARTS and TREE-GT require significant extension with a non-tree DAG—the child nodes overlap and there can be multiple paths from the root, possibly creating inconsistent probabilities—and because MAX-CONF is fundamentally unusable. Information gain is used as reward and normalize it by the maximum possible (i.e., that of leaf nodes) such that the information gain of a flat classifier equals its accuracy.

Results on ILSVRC65. FIGS. 9A and 9B present the reward-vs-accuracy curves. Shown in FIG. 9A is reward (normalized information gain, with 1 as the maximum possible) versus accuracy. The numbers in brackets on the Y axis indicate the equivalent of number of uncertain classes. The error bars are the standard deviation from 5 training sets, each with 100 images per class randomly sampled from a set of about 1,500 per class. Shown in FIG. 9B is the distribution of predictions of DARTS with 0.9 and 0.99 accuracy guarantees.

The accuracy guarantee $1-\in$ is set to $\{0, 0.1, 0.2, \ldots, 0.8, 0.85, 0.9, 0.95, 0.99\}$ and the reward and actual accuracy achieved are plotted on the test set. Note that all methods are able to satisfy an arbitrary accuracy guarantee, except MAX-CONF that has a fixed accuracy.

First, observe that the LEAF-GT curve starts with an accuracy and information gain both at 0.391, where the global threshold is too low to reject any example, making LEAFGT equivalent to a flat classifier. The normalized information gain here equals the flat accuracy. In contrast, the DARTS curve, according to an embodiment of the present invention, starts with an accuracy of 0.583, achieved by maximizing the reward with a low, inactive accuracy guarantee. This is much higher than the flat accuracy 0.391 because the rewards on internal nodes already attract some uncertain examples that would otherwise be predicted to leaf nodes. Moreover, DARTS gives more correct information than the flat classifier (0.412 versus 0.391); at this point the classifier according to an embodiment is better than a flat classifier in terms of both accuracy and information gain. As the accuracy guarantee is increased, specificity is traded off for better accuracy and the information gain drops.

To interpret the information gain, the equivalent number of uncertain leaf classes in FIG. 9A is provided. For example, at 0.9 accuracy, on average DARTS according to an embodiment of the present invention gives the same amount of correct information as a classifier that always correctly predicts an internal node with 14.57 leaf nodes.

FIG. 9A shows that both versions of DARTS significantly beat the baselines, validating the analysis on the optimality of DARTS. Interestingly both versions perform equally well, suggesting that DARTS is not sensitive to the particular means of estimating posterior probabilities.

FIG. 9B plots the distribution of predictions over different semantic levels for DARTS. As the accuracy guarantee increases, the distribution shifts toward the root node. At 0.9 accuracy, the classifier predicts leaf nodes 27% of the time and one of the 5 basic classes 49% of the time. Given that the flat accuracy is only 0.391, this is a useful trade-off with a high accuracy and a good amount of information.

FIGS. 10A and 10B present the reward-vs-accuracy curves for ILSVRC1K and ImageNet10K. On both datasets, DARTS, as an embodiment of the present invention, achieves large improvements over the baselines. Also, at the start of the DARTS curve on ILSVRC1K (e.g., with an inactive accuracy guarantee), DARTS beats the flat classifier (the start of the LEAF-GT curve) on both information gain (0.423 versus 0.415) and accuracy (0.705 versus 0.415).

FIGS. 10C and 10D show how the distribution of predictions changes with accuracy for DARTS according to an embodiment of the present invention. As accuracy increases, more examples are predicted to non-root internal nodes instead of leaf nodes. Eventually almost all examples move to the root node. On ILSVRC1K at 0.9 accuracy, 28% of the examples are predicted to leaf nodes, 55% to non-root internal nodes, and only 17% to the root node (i.e., the classifier declares "entity"). On ImageNet10K, the corresponding numbers are 19%, 64%, and 17%. Given the difficulty of problem, this is encouraging.

Shown in FIG. 11 is a comparison of confusion matrices 1102 and 1104 on ILSVRC1K classes between a flat classifier and the classifier according to an embodiment with a 0.95 accuracy guarantee. The rows represent leaf nodes; the columns are ordered from leaf to root by node height and then by the DFS order of the hierarchy. The matrices are down-sampled; each pixel represents the maximum confusion between 4×4 entries. Correct predictions are shown in one color (e.g., green) and incorrect ones in another color (e.g., red). In this way, FIG. 11 shows that the classifier according to an embodiment significantly reduces the confusion among leaf nodes.

FIG. 12 is a collection of difficult test images in ILSVRC1K and the predictions made by a conventional classifier and a classifier according to an embodiment of the present invention with a 0.8 accuracy guarantee. The flat conventional classifier makes mistakes whereas the classifier according to an embodiment stays accurate by "hedging its bets."

In all of the experiments, DARTS, as an embodiment of the present invention, either returns $\lambda=0$ or is able to get sufficiently close to the accuracy guarantee in the binary search, as shown by all trade-off curves. This validates the presently described analysis that, under practical conditions, DARTS converges to an optimal solution.

Another advantage of the classifier according to an embodiment of the present invention over a flat one is the ability of zero-shot recognition: classifying images from an unseen class whose name is also unknown. The flat classifier completely fails with 0 accuracy and 0 information gain. The classifier according to an embodiment of the present invention, however, can predict internal nodes to "hedge its bets." FIGS. 13A and 13B show the performance of the classifier according to an embodiment of the present invention on 5 randomly chosen classes of ILSVRC65 taken out of the training set and the hierarchy. The classifier according to an embodiment is able to predict the correct internal nodes a significant amount of the time and with non-trivial information gain.

The final experiment is recognizing "unusual objects," objects that defy categorization at the subordinate levels. FIG. 14 compares the predictions of "unusual" images by the flat classifier versus a classifier according to an embodiment with a 0.7 accuracy guarantee, both trained on ILSVRC1K. The flat conventional classifier is confused whereas the classifier according to an embodiment of the present invention stays sensible.

In the present disclosure, the problem of optimizing accuracy-specificity trade-offs in large scale recognition was introduced. Among other things, the DARTS algorithm, as an embodiment of the present invention, has been discussed, its optimality analyzed, and its effectiveness demonstrated on large scale datasets. Embodiments of the present invention provide highly accurate and informative large scale recognition.

It should be appreciated by those skilled in the art that the specific embodiments disclosed above may be readily utilized as a basis for modifying or designing other algorithms or systems. It should also be appreciated by those skilled in the art that such modifications do not depart from the scope of the invention as set forth in the appended claims. For example, variations to the methods can include changes that may improve the accuracy or flexibility of the disclosed methods.

What is claimed is:

1. A method for classifying images, comprising:
   receiving an input image to classify using a computer system;
   scoring a likelihood of each individual node in a plurality of nodes of a classifier using a computer system, where the classifier includes a semantic hierarchy in which the plurality of nodes correspond to a hierarchy of named entities and a set of individual object classifiers to classify a likelihood that the input image contains a named entity in one of a plurality of leaf nodes from the plurality of nodes, where the plurality of leaf nodes correspond to a set of mutually exclusive named entities in the hierarchy of named entities;
   selecting an individual node from the plurality of nodes most descriptive of the image using a computer system, where the individual node is determined by:
      iteratively estimating a reward weight within the classifier that achieves a predetermined accuracy, where the accuracy of the classifier is determined by classifying a validation data set using the estimated reward weight;
      determining reward weighted likelihoods using the estimated reward weight that achieves the predetermined accuracy; and
      selecting as the individual node most descriptive of the image the individual node within the plurality of nodes in the semantic hierarchy that has the highest reward weighted likelihood;
   classifying the input image as a named entity corresponding to the individual node most descriptive of the image using a computer system; and
   returning the named entity as a classification of the input image using a computer system.

2. The method of claim 1, wherein the plurality of nodes within the semantic hierarchy further comprises a plurality of internal nodes and a unique root node, wherein each of the internal nodes correspond to a named entity that is a union of named entities corresponding to at least one leaf node.

3. The method of claim 2, wherein the input image is an unknown named entity, and wherein the individual node most descriptive of the input image is one of the plurality of internal nodes.

4. The method of claim 1, wherein the set of individual object classifiers is a set of support vector machines (SVMs).

* * * * *